(12) United States Patent
Noui et al.

(10) Patent No.: US 11,536,976 B2
(45) Date of Patent: Dec. 27, 2022

(54) AUGMENTED REALITY DISPLAY

(71) Applicant: TriLite Technologies GmbH, Vienna (AT)

(72) Inventors: Louahab Noui, Upper Hartfield (GB); Joerg Reitterer, Brunn am Gebirge (AT)

(73) Assignee: TriLite Technologies GmbH, Vienna (AT)

( * ) Notice: Subject to any disclaimer, the term of this patent is extended or adjusted under 35 U.S.C. 154(b) by 0 days.

(21) Appl. No.: 17/543,856

(22) Filed: Dec. 7, 2021

(65) Prior Publication Data

US 2022/0197034 A1    Jun. 23, 2022

(30) Foreign Application Priority Data

Dec. 23, 2020  (EP) .................................... 20216834

(51) Int. Cl.
*G02B 27/01*        (2006.01)
*G02B 26/08*        (2006.01)

(52) U.S. Cl.
CPC ..... *G02B 27/0172* (2013.01); *G02B 26/0833* (2013.01); *G02B 27/0179* (2013.01); *G02B 2027/0187* (2013.01)

(58) Field of Classification Search
CPC ............ G02B 27/0172; G02B 26/0833; G02B 27/0179; G02B 2027/0187; G02B 27/0081
See application file for complete search history.

(56) References Cited

U.S. PATENT DOCUMENTS

| | | | |
|---|---|---|---|
| 9,134,534 B2 | 9/2015 | Border et al. | |
| 2007/0188837 A1 | 8/2007 | Shimizu et al. | |
| 2013/0127980 A1* | 5/2013 | Haddick | G06F 3/013 348/14.08 |
| 2016/0077338 A1* | 3/2016 | Robbins | G02B 27/4205 359/489.08 |
| 2016/0231570 A1* | 8/2016 | Levola | G02B 6/0035 |
| 2016/0234485 A1* | 8/2016 | Robbins | G06T 19/006 |
| 2017/0097506 A1* | 4/2017 | Schowengerdt | G06T 15/005 |

(Continued)

FOREIGN PATENT DOCUMENTS

| | | |
|---|---|---|
| WO | 2018014467 A1 | 1/2018 |
| WO | 2018057660 A2 | 3/2018 |
| WO | 2020007360 A1 | 1/2020 |

OTHER PUBLICATIONS

Extended European Search Report dated May 17, 2021 in corresponding EU Application No. 20216834.0.

*Primary Examiner* — Dmitriy Bolotin
(74) *Attorney, Agent, or Firm* — Hoffmann and Baron, LLP; Glenn Henneberger

(57) ABSTRACT

An augmented reality display for displaying, in addition to a light field of a surrounding, an image to a user's eye, comprises a support, a light source to emit a collimated light beam carrying said image, a micro-electro-mechanical-system, MEMS, mirror to deflect the collimated emitted light beam as a collimated deflected light beam, a waveguide to guide and couple the collimated deflected light beam out as a collimated expanded light beam, and a semitransparent combiner to superpose the collimated expanded light beam as an image light beam with the light field of the surrounding for displaying to the user's eye.

24 Claims, 4 Drawing Sheets

(56) References Cited

U.S. PATENT DOCUMENTS

| | | | |
|---|---|---|---|
| 2017/0160548 A1* | 6/2017 | Woltman | G02B 27/0172 |
| 2017/0322426 A1* | 11/2017 | Tervo | G02B 6/124 |
| 2018/0120559 A1* | 5/2018 | Yeoh | G02B 5/1842 |
| 2018/0268518 A1* | 9/2018 | Nourai | G06T 15/205 |
| 2018/0284440 A1 | 10/2018 | Popovich et al. | |
| 2018/0284460 A1* | 10/2018 | Cheng | G02B 27/1026 |
| 2019/0285897 A1* | 9/2019 | Topliss | G02B 27/0176 |
| 2019/0293838 A1* | 9/2019 | Haba | G02B 27/0172 |
| 2019/0391396 A1* | 12/2019 | Saarikko | G02B 27/0172 |
| 2020/0341194 A1* | 10/2020 | Waldern | G02F 1/13342 |
| 2021/0026139 A1* | 1/2021 | Harder | G02C 11/10 |
| 2021/0364803 A1* | 11/2021 | Schowengerdt | G02B 27/0172 |
| 2021/0382309 A1* | 12/2021 | Utsugi | G02B 27/0172 |
| 2022/0197034 A1* | 6/2022 | Noui | G02B 27/0081 |

\* cited by examiner

AUGMENTED REALITY DISPLAY

CROSS-REFERENCE TO RELATED APPLICATIONS

This application claims priority to European Patent Application No. 20 216 834.0, filed on Dec. 23, 2020, the entirety of which is incorporated herein by reference.

TECHNICAL FIELD

The present disclosed subject matter relates to an augmented reality (AR) display for displaying, in addition to a light field of a surrounding, an image to a user's eye.

BACKGROUND

Displays of this kind are commonly used in AR glasses, AR helmets or head-up displays for a broad range of applications like navigation, training, entertainment, education or work. A light source such as a laser or light emitting diode emits, e.g. by integrated collimation optics, a collimated light beam carrying an image comprised of pixels onto a moving micro-electro-mechanical-system (MEMS) mirror which deflects the collimated light beam into subsequent directions (angles), one direction (angle) per pixel of the image. For example, the MEMS mirror oscillates fast about a vertical axis and slowly about a horizontal axis to sweep the directions and, thus, scan the pixels row by row and line by line. The MEMS mirror deflects the light beam typically onto one side of a semitransparent combiner which redirects it towards the user's eye while concurrently superposing it with the light field from the surrounding. The cornea and the lens of the eye focus each light beam from a specific direction onto one image point on the retina, so that all image points on the retina then form the image perceived by the user.

The entire image can only be perceived when light beams from all directions which the MEMS mirror generates can actually pass the user's pupil. The area in front of the display within which the eye has to be located to this end is called "eye box" of the display. The position of the user's pupil with respect to the display cannot, however, be precisely specified a priori. Users with different head shapes or sizes wear AR glasses or helmets differently or look differently through AR head-up displays, and users will also move relatively to the display during use. Therefore, a large eye box is desirable to allow for any such misalignments and movements in order to reach a wide applicability of the display for a variety of users.

The size of the eye box could principally be increased by increasing the cross section of the collimated light beam passing the eye box at a given instant in time in the respective direction (angle) which generates the corresponding pixel. However, the MEMS mirror constrains the cross section of the deflected light beam: For obtaining a high scanning rate and, hence, a high quality image without flickering, a MEMS mirror of small mass needs to be used, which limits the size of its reflective area to 1-2 mm in diameter. Consequently, a compromise between the size of the eye box and the quality of the AR image has to be found.

BRIEF SUMMARY

It is an object of the present disclosed subject matter to overcome these limitations of the state of the art and to provide an AR display with an increased eye box and an improved image quality.

This object is achieved with an AR display for displaying, in addition to a light field of a surrounding, an image to a user's eye, comprising: a support; a light source supported by the support and configured to emit a collimated light beam carrying said image; a micro-electro-mechanical-system (MEMS) mirror sup-ported by the support and configured to deflect the collimated emitted light beam as a collimated deflected light beam; a first waveguide supported by the support and having an in-coupling section configured to couple the collimated deflected light beam into the first waveguide, a guiding section configured to guide the collimated deflected light beam through the first waveguide, and an out-coupling section configured to couple the collimated deflected light beam out from the first waveguide as a collimated expanded light beam whose cross section is larger than the cross section of the collimated deflected light beam; and a semitransparent combiner supported by the support and configured to superpose the collimated expanded light beam as an image light beam with the light field of the surrounding for displaying to the user's eye.

Applicants have, for the first time, combined a MEMS mirror generating a time-multiplexed angular separation of the image's pixels carried by the light beam, a waveguide expanding the pixel-wise angularly deflected light beam in cross-section, and a semitransparent combiner superposing the expanded AR image and the image of the surrounding. The inventive interaction of the MEMS mirror, the waveguide and the combiner improves the functions of all of these elements. As the waveguide expands the light beam downstream of the MEMS mirror, the size of the MEMS mirror does not con-strain the cross section of the light beam any more. The reflective area and the mass of the MEMS mirror can be as small as required to achieve a fast MEMS mirror movement. Consequently, a high scanning rate and a flicker-free AR image, independent of the cross section of the light beam and, hence, the eye box size, can be obtained.

The waveguide is also separate from and upstream of the combiner such that the eye box expansion is separate from the AR image superposition downstream. This allows to use any type of combiner known in the art, e.g., a semitransparent mirror of arbitrary curvature ("freeform combiner"), a holographic combiner element encoding the function of such a freeform combiner, or—and this is particularly useful as discussed later on—a second waveguide as a combiner, to generate an AR image with an even larger eye box and improved image quality.

Last but not least, compared to conventional optical light beam expansion setups with lenses or prisms, the waveguide interposed between the MEMS mirror and the AR combiner has a particular thin form factor and low weight. It can perform an isogonal expansion of the light beam, i.e., the angles between successive angular directions of the input light beam coming from the MEMS mirror and the angles be-tween the successive angular directions of the expanded output light beam sent to the combiner are unaltered, without affecting the user's field of view. In addition, such a waveguide can also be configured to generate a uniform intensity profile of the output light beam over its cross section so that the user will not experience brightness fluctuations of the AR image when moving his/her pupil inside the eye box.

As a result the refresh rate, eye box size, field of view and brightness which were previously affecting each other in conventional AR displays can now be individually tailored and optimized, yielding an AR display with a large eye box and high image quality.

The AR display of the disclosed subject matter can be integrated into a variety of devices, from head-up displays to AR handheld devices, AR helmets etc. In an embodiment the AR display of the disclosed subject matter forms a pair of glasses, in that the support is a spectacle frame and the semitransparent combiner is supported on the frame in the manner of an eyeglass, e.g., as the whole eyeglass or a part thereof. This brings the AR display close to the user's eye so that with even a relatively small combiner a large field of view can be obtained.

Depending on the type of combiner used, the image light beam may either be collimated for the AR image to be focused by the eye in an object plane at infinity, or may be divergent to be focused by the eye in an object plane closer to the user. The object plane of the AR image can also be shifted by additional optics, e.g., push or pull lenses, included in or arranged upstream or downstream of the combiner. It goes without saying that any such optics which also affect the passing light field of the surrounding can be ac-counted for by respective compensation optics introduced in-to the light field's light path, for an accurate display of the surrounding.

In a first embodiment of the disclosed subject matter the combiner comprises a semitransparent mirror configured to reflect the collimated expanded light beam, optionally de-collimated by additional optics, on its side facing the user's eye as said image light beam while letting pass the light field of the surrounding impinging on its opposite side. Semitransparent mirrors, also of arbitrary curvature ("freeform combiners"), reflect the collimated expanded light beam without dispersion so that the AR image can be displayed without any chromatic aberrations. Moreover, by shaping the semitransparent mirror accordingly the object plane can be fitted to the user's needs, e.g., to achieve a focus at a regular working distance when augmenting a work place surrounding. The additional optics upstream of the semitransparent mirror can, e.g., be used for said object plane shifting and/or to compensate for unequal reflection over the semitransparent mirror.

In a variant of this first embodiment the semitransparent mirror is formed by a holographic optical element. Holographic optical elements (HOEs) can encode the function of a semitransparent mirror in form of a hologram. HOEs can also be configured to reflect the collimated expanded light beam with an even larger cross section, i.e., expanded twice, to further increase the size of the eye box. Compared to conventional semitransparent mirrors, HOEs can also be fabricated on a flatter substrate, yielding a thinner and lighter combiner with a higher transmittance of the light field of the surrounding.

In a second embodiment of the disclosed subject matter the semitransparent combiner is a second waveguide supported by the support and having an in-coupling section configured to couple the collimated expanded light beam into the second waveguide, a guiding section configured to guide the collimated expanded light beam through the second waveguide, and an out-coupling section configured to couple the collimated expanded light beam out from the second waveguide on its side facing the user's eye as said image light beam while letting pass the light field of the surrounding impinging on its opposite side.

The second waveguide guides the light beam, which has been expanded by the first waveguide, along the length of its guiding section to its out-coupling section. The position of the exiting AR image can thus be readily defined by the form and length of the waveguide and the position and shape of its out-coupling section, where the AR image is superposed with the image of the surrounding.

Furthermore, for a collimated image light beam the second waveguide can be used with particular benefit to expand the cross section of the input light beam (which had been expanded by the first waveguide) a second time. Expanding the cross section of the AR light beam in two stages—firstly by the first waveguide and secondly by the second waveguide—overcomes the so-called "banding" problem otherwise encountered with a single waveguide performing the entire expansion in one step. When the ratio between the sizes of the in- and out-coupling sections becomes too large and the waveguide too thick, or the refractive index of the waveguide is too low, the intensity profile of the output light beam becomes "banded", i.e., falls apart into individually discernable intensity peaks, each of the size of the input light beam profile, which do not sum up to one smooth—e.g., Gaussian or flat ("top-hat")—output light beam profile any more. The banding effect increases with the thickness and decreases with an increasing refractive index of the waveguide in case of waveguides which guide the input beam to the output section by total internal reflections repeated in successive "walk length" intervals. On the other hand, for practical reasons a waveguide cannot be made too thin, as it would crack or break in use. Therefore, by splitting-up the beam expansion into two stages, each performed by a separate waveguide, the size ratio of the in- and out-coupling sections can be reduced, allowing for minimized waveguide thicknesses in each of the two waveguides. By this means, banding effects can be effectively mitigated or even eliminated at all while maintaining sufficient mechanical strength. In this way, a particularly large eye box can be achieved without loss of image quality.

The waveguides may have any shape, e.g., semi-cylindrical, parallelepipedical, curved, etc. Advantageously, the waveguides each have substantially the shape of a plate. The parallel large sides of the plate will act as guiding section by total internal reflection therebetween while supporting the in- and out-coupling sections either thereon, subsurface or therebetween, in the plate.

As discussed above, the problem of "banding" is less critical the thinner the waveguide is with respect to the size of the in-coupling section. Hence, to minimize banding, in a particularly advantageous embodiment the first waveguide has a smaller plate thickness than the second waveguide, as it also has an in-coupling section of smaller size.

For the coupling-in or coupling-out of the respective light beam, the first and second waveguides may comprise any known coupling element, e.g., one or several semitransparent mirrors, a multitude of successive micro-mirrors, a prism, a fiber, etc. Optionally, at least one of the in- or out-coupling sections of at least one of the first or the second waveguide (if any) is formed by a diffraction grating. A diffraction grating allows to obtain a high coupling efficiency over a wide area. Moreover, using an in-coupling diffraction grating and a similar out-coupling diffraction grating allows to use the same diffraction order, e.g., the positive and negative first diffraction order, for said coupling-in and coupling-out such that other diffraction orders can effectively be suppressed and, hence, hindered from causing interferences in the display.

In this embodiment, optionally at least one of the first or the second waveguide has a mirror at the far side of its in-coupling diffraction grating when seen from the respective light beam to be coupled in, or the first wave-guide has a mirror at the far side of its out-coupling diffraction grating when seen from the collimated expanded light beam to be coupled out. Such a mirror redirects any parts of the light originating from the diffraction grating in a reverse ("wrong") direction back to the correct forward ("right") input or output direction of the grating. Thereby, the optical efficiency of the waveguide can be increased, e.g., by up to 40%. Moreover, as the first waveguide of the disclosed subject matter does not have to be transparent the mirror/s can even extend into or cover its guiding section. When the mirror is spaced apart from the corresponding diffraction grating, e.g., by an air gap of a few microns, a possible interference with the diffraction grating can be reduced or eliminated.

For the same reasons, optionally the second waveguide has a semitransparent mirror at the far side of its out-coupling diffraction grating when seen from the image light beam to be coupled out.

Further optionally, the semitransparent mirror at the far side of the out-coupling diffraction grating of the second waveguide is wavelength-selective, e.g., by means of filters or holographic structures. Thereby, the colors of the image and the surrounding can be selected independently, e.g., to use different colors for displaying the image and the surrounding for a more clearly distinguished image, to suppress stray light, etc.

Depending on a coherence length of the light source the collimated light beam may show more or less pronounced intensity fluctuations and patterns across its cross section induced by interference and multiple reflections within the waveguide, so-called "speckle patterns". In a favorable embodiment the guiding section of at least one of the first or the second waveguide (if any) includes a speckle reducing element. The speckle reducing element, sometimes called a "despeckler", breaks up the coherence of the guided light beam, e.g., by modulating the polarization, the phase or the amplitude of the guided light beam and, thus, reduces said fluctuations and interferences.

In a further embodiment, the guiding section of at least one of the first or the second waveguide (if any) can include an intermediate diffraction grating configured to enlarge the cross section of the respective light beam guided through said guiding section. Thereby, a dedicated diffraction grating for light beam expansion is used, resulting in a more modular structure of the respective waveguide. For example, the intermediate diffraction grating could expand the guided light beam in a first dimension and the out-coupling diffraction grating in a second dimension.

As mentioned above, the first and second waveguides can be used to shape the cross section as well as the intensity profile across the cross section of the light beam. The disclosed subject matter provides for three—optionally combinable—variants of such a beam shaping.

In the first variant the out-coupling section of at least one of the first or the second waveguide (if any) has an out-coupling efficiency increasing with distance from the respective in-coupling section. As the light beam guided over the out-coupling section loses intensity with every coupling-out of a portion of it, the increasing efficiency with distance can compensate for this intensity loss and achieve a uniform intensity of the output light beam over the length of the out-coupling section and, consequently, a uniform intensity profile of the collimated output light beam across its cross section.

In the second variant the light source is configured to emit a light beam with a Gaussian intensity profile across its cross section, and the first or second waveguide (if any) is configured to couple in a light beam with a Gaussian intensity profile across its cross section and to couple out a light beam with a top-hat intensity profile across its cross section. Light sources, e.g., with integrated collimation optics, emitting a light beam with a Gaussian intensity profile across its cross section, i.e., a "Gaussian light beam", are readily available and can be small, light-weight and compact. The shaping of the Gaussian input light beam into the top-hat output light beam yields a perfectly uniform eye box such that a movement of the user's eye or the display does not affect the brightness of the perceived pixels of the image.

In the third variant the first or second waveguide (if any) is configured to couple in a light beam with an elliptical or rectangular cross section and to couple out a light beam with a circular or square cross section. Again, this yields a particularly uniform eye box.

In a further aspect, the disclosed subject matter pro-vides for a stereoscopic display system comprising two AR displays, each according to one of the above-mentioned embodiments or variants, wherein the two AR displays share at least one of the support, the light source, the MEMS mirror or the semitransparent combiner. Due to said sharing, the number of necessary elements can be reduced.

BRIEF DESCRIPTION OF DRAWINGS

The disclosed subject matter will now be described by means of exemplary embodiments thereof with reference to the enclosed drawings, in which show.

DETAILED DESCRIPTION

Figure 1:
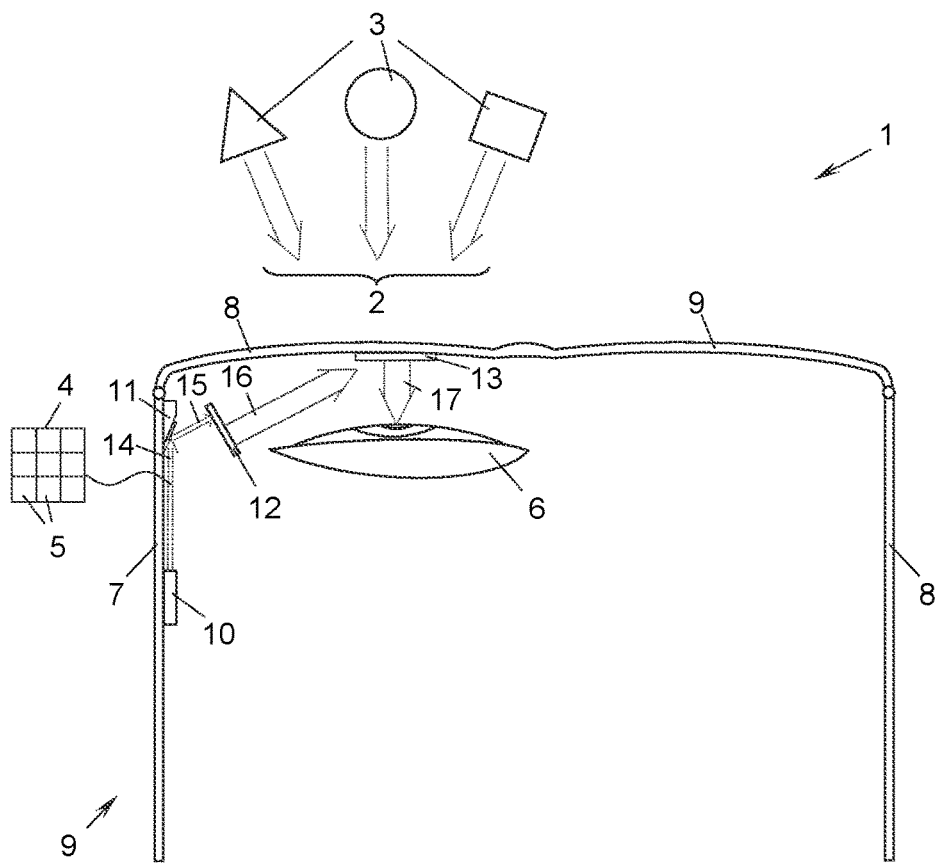
FIG. 1 an embodiment of the augmented reality (AR) display of the disclosed subject matter as AR glasses in a schematic top view.
Figure 2:
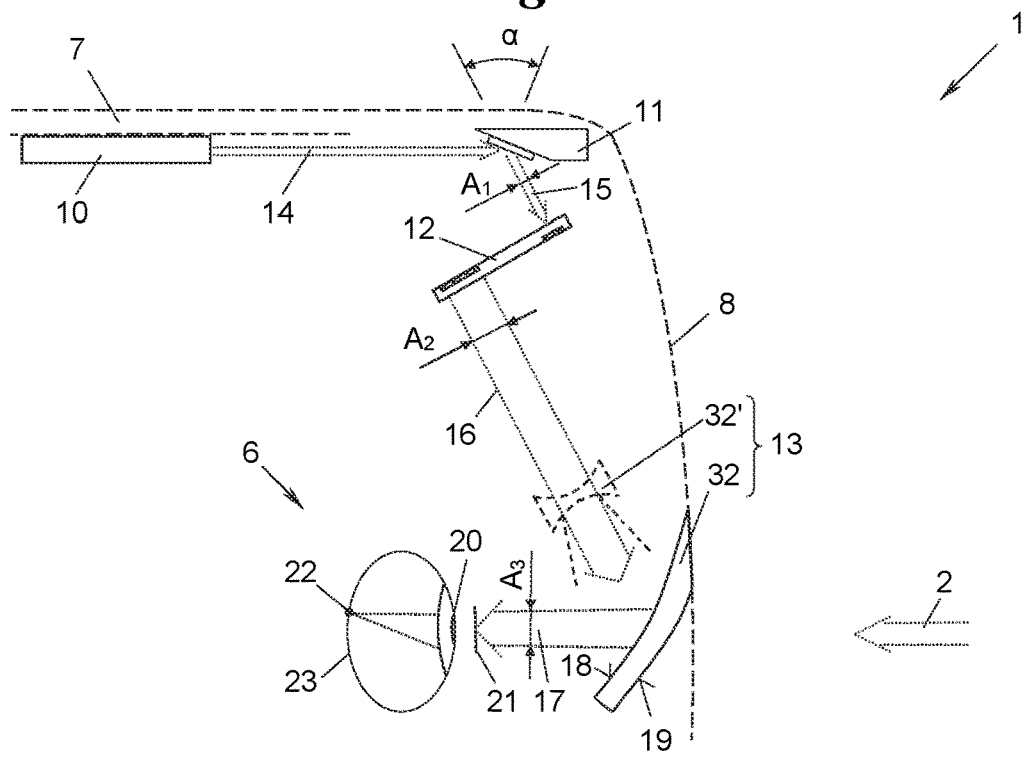
FIG. 2 in detail the MEMS mirror, waveguide, and a first embodiment of the semitransparent combiner of the display of FIG. 1 in the form of a mirror with schematic light paths in an enlarged fragmentary top view.
Figure 3:
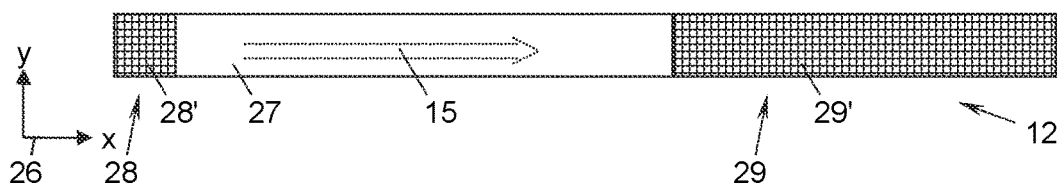
FIGS. 3 and 4 a first embodiment of the waveguide of the display of FIGS. 1 and 2 with schematic light paths in a top view (FIG. 3) and a cross section (FIG. 4), respectively.
Figure 4:
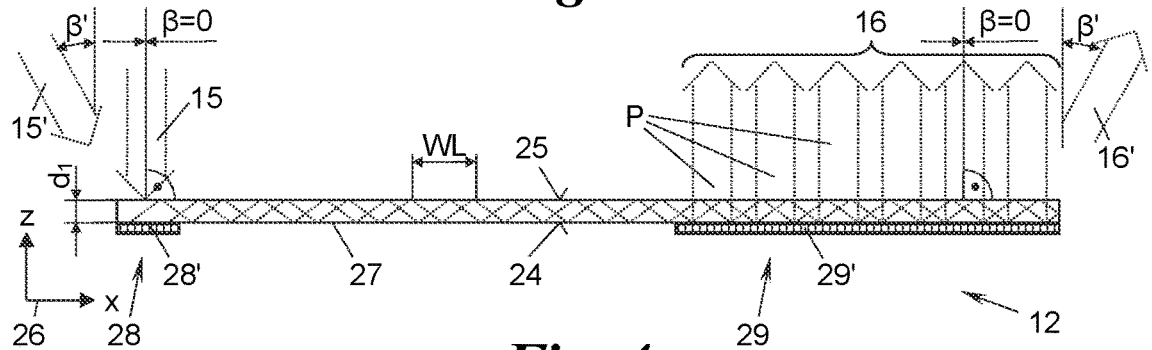

FIGS. 1 and 2 show an augmented reality (AR) display 1 for displaying, in addition to a light field 2 of a surrounding 3, an image 4 comprised of pixels 5 to a user's eye 6. The image 4 can, e.g., be monochromatic or colored, a single image or part of a video sequence of images. The images 4 can augment any surrounding 3 such as a landscape, an urban environment, a road, a classroom, a workplace etc. so that the user can perceive additional information, e.g., for navigation, work, education, training or entertainment as an overlay ("AR image") of the light field 2 ("view") of the surrounding 3. To this end, the display 1 can be a head-up display for a vehicle, an AR helmet or AR glasses to be worn by a user, a handheld AR device just like a smartphone, or the like.

In the exemplary embodiment shown in FIG. 1 the display 1 is integrated into a pair of glasses ("AR glasses") comprised of a spectacle frame with a pair of temples 7 and a pair of eye glasses 8. The spectacle frame forms a support 9 for the display 1, onto or into which primary components of the display 1 are mounted or integrated, that are: a light source 10, a micro-electro-mechanical-system (MEMS) mirror 11, a waveguide 12, and a semitransparent combiner 13.

The light source 10 emits a collimated light beam 14 which carries the image 4 in a time-multiplexed manner, i.e. the intensity values of the pixels 5 one after the other, e.g., row-by-row and line-by-line per image 4 comprised of a grid of pixels 5, and image-by-image per video comprised of a sequence of images 4. For this purpose the light source 10 can be of any type known in the art configured to emit a collimated light beam 14. In most embodiments, the light source 10 is a semiconductor light source such as a light emitting diode (LED), microLED (µLED), or laser diode, e.g., edge-emitting laser diode or surface-emitting laser diode. For color pixels 5, the light source 10 may be a polychromatic light source 10, e.g., a set of laser diodes of three primary color which emit a light beam 14 comprised of three different wavelengths for color perception.

Downstream of the light source 10 the MEMS mirror 11 deflects the light beam 14 as a (collimated) "deflected" light beam 15 into subsequent directions (angles) α, one direction α per pixel 5 of the image 4, towards the waveguide 12. The MEMS mirror 11 can, e.g., oscillate fast about a vertical axis and slowly about a horizontal axis to sweep the directions a and, thus, reproduce the pixels 5 of an image 4 row-by-row and line-by-line, and image-by-image for a sequence of images 4. Alternatively, the MEMS mirror 11 can sweep ("scan") the directions a by any other movement, e.g., by means of Lissajous curves, to reproduce the images 4.

The waveguide 12 receives the deflected light beam 15 from the MEMS mirror 11 and guides it towards the semitransparent combiner 13.

On its way through the waveguide 12 the deflected light beam 15 is expanded (enlarged) in its cross section so that it exits the waveguide 12 as an "expanded" light beam 16 with a cross section $A_2$ which is larger than the cross section $A_1$ of the deflected light beam 15, as will be detailed further below with reference to FIGS. 3-6. For example, the cross sections $A_1$, $A_2$ of the deflected and expanded light beams 15, 16 can be 0.5-4 mm² and 8-32 mm², respectively.

Downstream of the waveguide 12, the semitransparent combiner 13 redirects the expanded light beam 16 as an "image" light beam 17 towards the user's eye 6 for superposing the image 4 with the light field 2 of the surrounding 3. To this end, the semitransparent combiner 13 not only redirects the expanded light beam 16 impinging on its one side 18 facing the user's eye 6 but also lets pass the light field 2 of the surrounding 3 impinging on its opposite side 19, i.e., its far side with respect to the eye 6, so that the user perceives both the AR image 4 as well as the surrounding 3.

The image light beam 17 carrying the AR image 4 can, however, only be perceived if it actually passes the pupil 20 of the user's eye 6. An area 21 in front of the user's eye 6, in which the pupil 20 has to be located to perceive the image light beam 17 from every direction α the MEMS mirror 11 generates, and, hence, the whole image 4, is called "eye box" of the display 1.

As can be seen in FIGS. 1 and 2, the eye box 21 is the larger, the larger the cross-section $A_3$ of the image light beam 17 is. Moreover, the perceived brightness of each pixel 5 depends on the intensity profile $IP_3$ (see FIGS. 5b, 5c, 10) of the image light beam 17 across its cross section $A_3$. An eye box 21 with a uniform intensity profile $IP_3$ over its extent yields a constant brightness perception thereover and allows for translations and rotations of the user's eye 6 without disturbing perception of the image 4.

The user's eye 6 is an optical system per se whose cornea and lens focus the image light beam 17 onto one image point 22 on the retina 23 per direction α. In case of a perfectly collimated (parallel) image light beam 17 per direction α the eye 6 will let the image 4 appear in an object plane at infinity. In order to shift the image 4 to a different object plane, i.e. to appear at a viewing distance of, e.g., 40-60 cm from the eye 6, the display 1 can comprise a semitransparent combiner 13 with an optical power or additional optics as known in the art, e.g., optional push and pull lenses down or upstream of the combiner 13. Any such optics which may also affect the passing light field 2 of the surrounding 3 can optionally be compensated by respective optics in the light path of the light field 2, to accurately view the surrounding 3.

The working principle of the waveguide 12 will now be explained in detail under reference to FIGS. 3, 4 and 5a-5d. The waveguide 12 has the form of a thin plate with two opposing large sides 24, 25 parallel to the x-y plane and a thickness $d_1$ in the z direction of coordinate system 26. The waveguide 12 is made from a transparent glass or synthetic material and guides light rays along its length (here: in x-direction) by total internal reflection between its sides 24, 25 over a guiding section 27. In alternative embodiments, the waveguide 12 may not be plate-shaped but can have any other shape, e.g., semi-cylindrical, parallelepipedical, curved, etc., which is able to guide light rays by internal reflections.

At its input the waveguide 12 has an in-coupling section 28 to couple in the deflected light beam 15, which impinges under a direction (angle) β depending on the deflection direction (angle) a, into the guiding section 27. The in-coupling section 28 may be formed by a diffraction grating 28' which diffracts the deflected light beam 15 mainly into one diffraction order, e.g., into the first diffraction order to couple the deflected light beam 15 under an angle above the critical angle of total internal reflection into the guiding section 27. Instead of the diffraction grating 28' any other optical element for coupling the deflected light beam 15 under said angle into the guiding section 27 may be employed, such as a prism, a fiber, etc.

The guiding section 27 guides the in-coupled deflected light beam 15 via a series of successive total internal reflections between its sides 24, 25 towards an out-coupling diffraction section 29 in form of an out-coupling diffraction grating 29' at the output of the waveguide 12. A characteristic length WL between two subsequent internal reflections on the same side 24 or 25 is called "walk length" of the waveguide 12. The walk length WL depends on the thickness d1 and said diffraction order determining the in-coupling angle into the guiding section 25.

The out-coupling diffraction grating 29' diffracts, at every walk length WL, a portion P of the deflected light beam 15 into mainly one diffraction order, e.g., into the first negative diffraction order, to couple out the portions P from the waveguide 12 under the same (or opposite) direction β. All portions P form the expanded light beam 16 with expanded cross section $A_2$ and expanded width $W_{x2}$ in x-direction. As a result, the waveguide 12 performs an isogonal expansion of the deflected light beam 15 into the expanded light beam 16, as can also be seen for exemplary light beams 15',16' with the subsequent direction β'. Instead of the diffraction grating 29' any other optical element for coupling the deflected light beam 15 out from the waveguide 12 may be employed as out-coupling section 29 such as one or several semitransparent mirrors, a multitude of successive micromirrors, one or more prisms, fibers, etc.

Any or both of the diffraction gratings 28',29' can be applied into or onto areas of the sides 24, 25, e.g., by etching, pressing or molding surface structures like steps, grooves, ridges etc., or embedded into the waveguide 12, e.g., in the form of structured voids or reflective films. Moreover, any or both of the diffraction gratings 28',29' can be a reflection or a transmission grating. In optional embodiments, the waveguide 12 has a mirror 28" (FIG. 8) behind the in-coupling diffraction grating 28', i.e., at its far side with respect to the input light beam 15, and/or a reflectorised guiding section 27, and/or a mirror 29" (FIG. 8) behind the out-coupling diffraction grating 29', i.e., at its far side with respect to the output light beam 16 such that no light passes the waveguide 12 on the side 24. In these embodiments the mirror 28",29" could also be distanced from the corresponding diffraction grating 28',29', e.g., by an air gap of a few microns or more.

The intensity I of each coupled-out portion P depends on the local diffraction efficiency E (FIG. 5d) of the out-coupling diffraction grating 29' (and similarly of the local diffraction efficiency of the in-coupling diffraction grating 28') and the walk length WL. By suitably choosing these parameters the intensity profile $IP_2$ ("shape") of the output expanded light beam 16 may be tailored independently of the intensity profile $IP_1$ of the input deflected light beam 15, as shown in a first example in FIGS. 5a and 5b and in a second example in FIG. 5c.

Figure 5A:
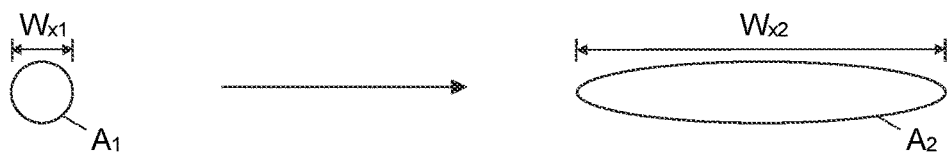
FIGS. 5a and 5b intensity profiles of the input and output light beams of a first variant of the waveguide of FIGS. 3 and 4 in a top view (FIG. 5a) and a cross section (FIG. 5b), respectively.
Figure 5B:
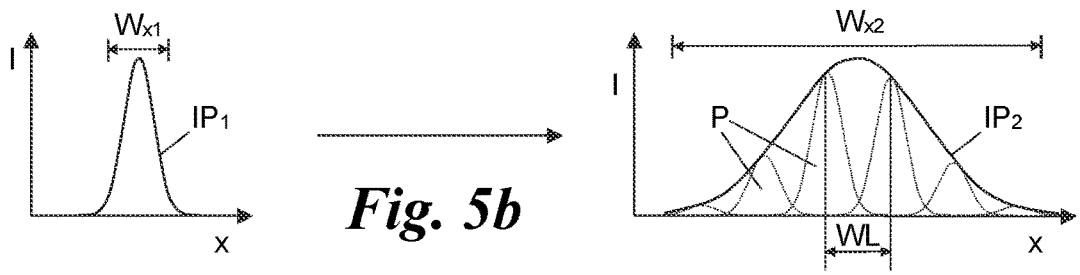
Figure 5C:
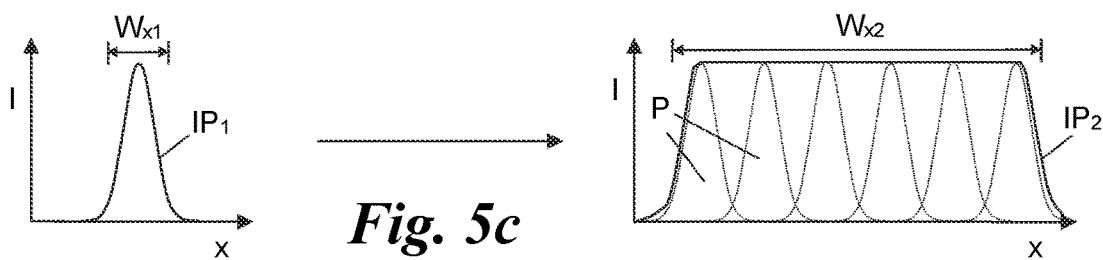
FIG. 5c intensity profiles of the input and output light beams of a second variant of the waveguide of FIGS. 3 and 4 in a cross section.
Figure 5D:
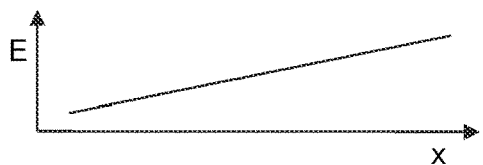
FIG. 5d an exemplary out-coupling efficiency profile of the out-coupling diffraction grating of the waveguide of FIG. 5c.

In FIGS. 5a and 5b a Gaussian input intensity profile $IP_1$ of the deflected light beam 15 is simply expanded into an output Gaussian intensity profile $IP_2$ of the expanded light beam 16 with increased width $W_{x2}$. In FIG. 5c the input Gaussian intensity profile $IP_1$ of the deflected light beam 15 is changed to a top-hat intensity profile $IP_2$ of the expanded light beam 16.

In FIGS. 3-5d, the principle of beam expansion and shaping in the waveguide 12 has been shown for the x-direction only. This may be useful to expand the eye box 21 of the display 1 in one direction, e.g., to accommodate for left-right movements of the pupil 20 or for different inter-pupillary distances of users. Of course, an expansion of the deflected light beam 15 in two dimensions is possible as well, as will now be shown in FIG. 6.

Figure 6:
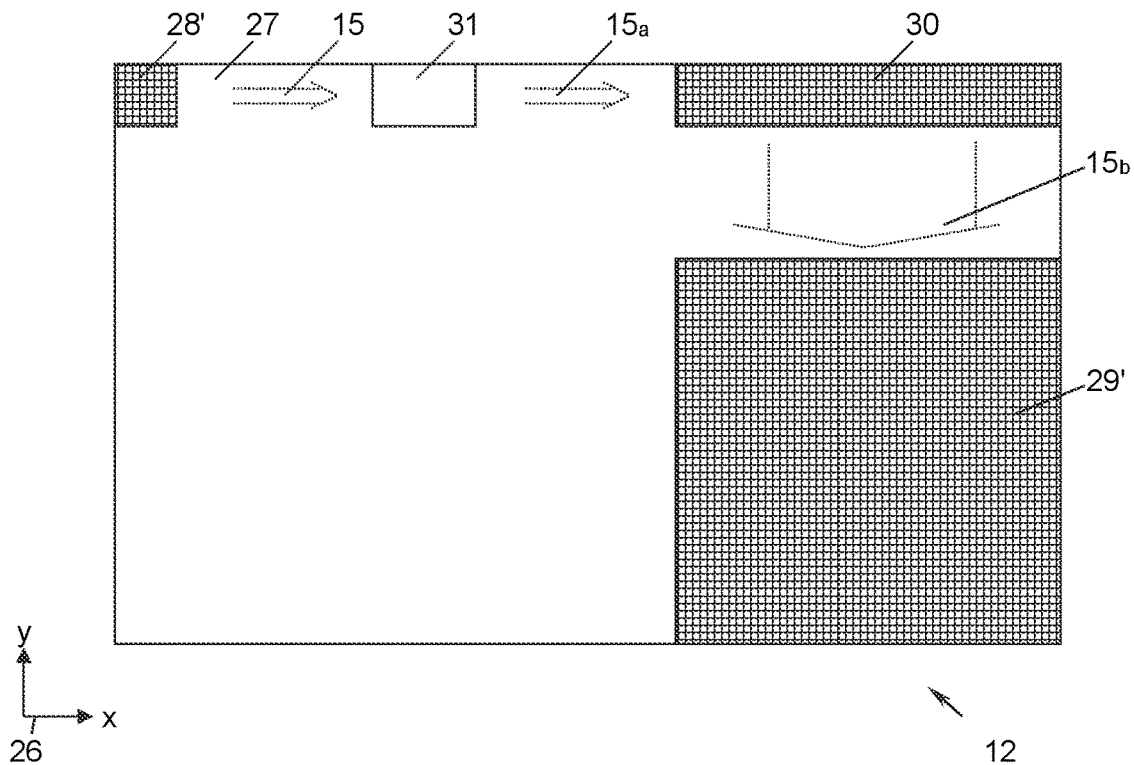
FIG. 6 a second embodiment of the waveguide of the dis-play of FIGS. 1 and 2 with schematic light paths in a top view.

In the embodiment of FIG. 6, the waveguide 12 includes an intermediate diffraction grating 30 over which the deflected light beam 15 (here: the light beam $15_a$) is expanded in its width $W_{x1}$ in x-direction and diffraction-guided (here: as the light beam $15_b$) towards the out-coupling grating 29' where it is expanded in its width $W_{y2}$ in y-direction in a similar way before exiting the waveguide 12. Thus, the beam widths $W_{x2}$, $W_{y2}$ as well as the output intensity profile $IP_2$ can be shaped in two dimensions by tailoring the waveguide 12 accordingly. Alternatively, the beam expansions in x- and y-directions can be done by integrating the intermediate diffraction grating 30 into the out-coupling section 29.

The waveguide 12 may optionally contain a speckle reducing element 31 to reduce random intensity fluctuations and interferences caused by the coherence of the emitted light beam 14. Speckle reducing elements 31 are known in the art and break up the coherence of the guided light beam 15, e.g., by modulating the polarization, the phase or the amplitude of the guided light beam 15 (here: as "despeckled" light beam $15_a$).

Figure 7:
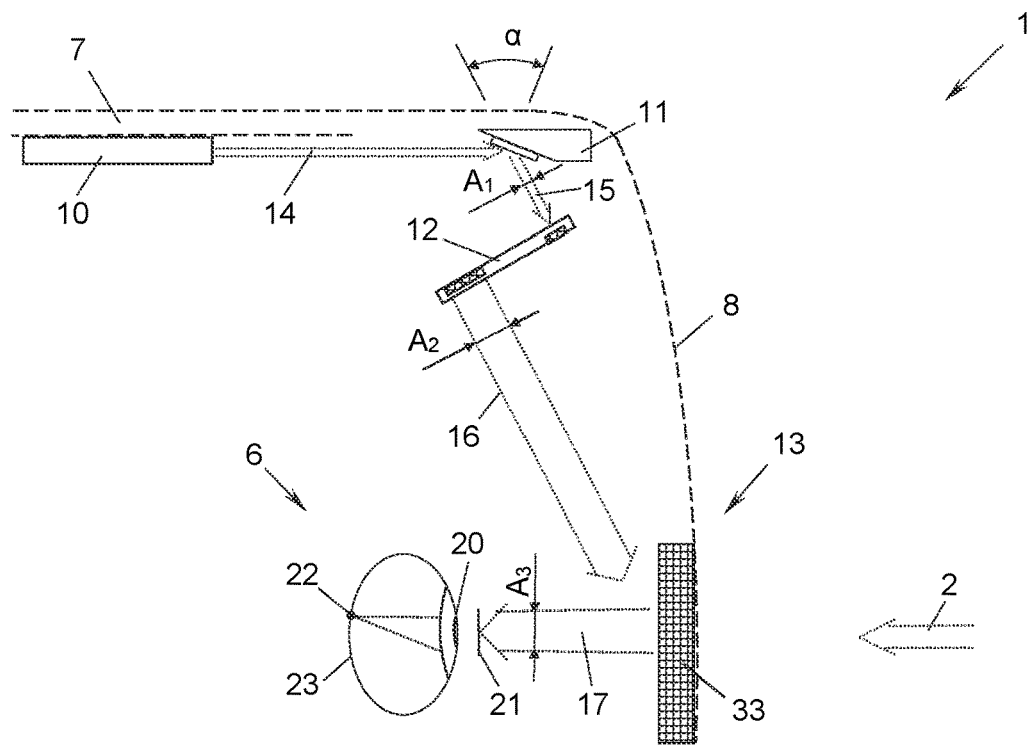
FIG. 7 in detail the MEMS mirror, waveguide, and a second embodiment of the semitransparent combiner of the dis-plays of FIGS. 1 and 3-6 in the form of a holographic optical element with schematic light paths in an enlarged fragmentary top view.
Figure 8:
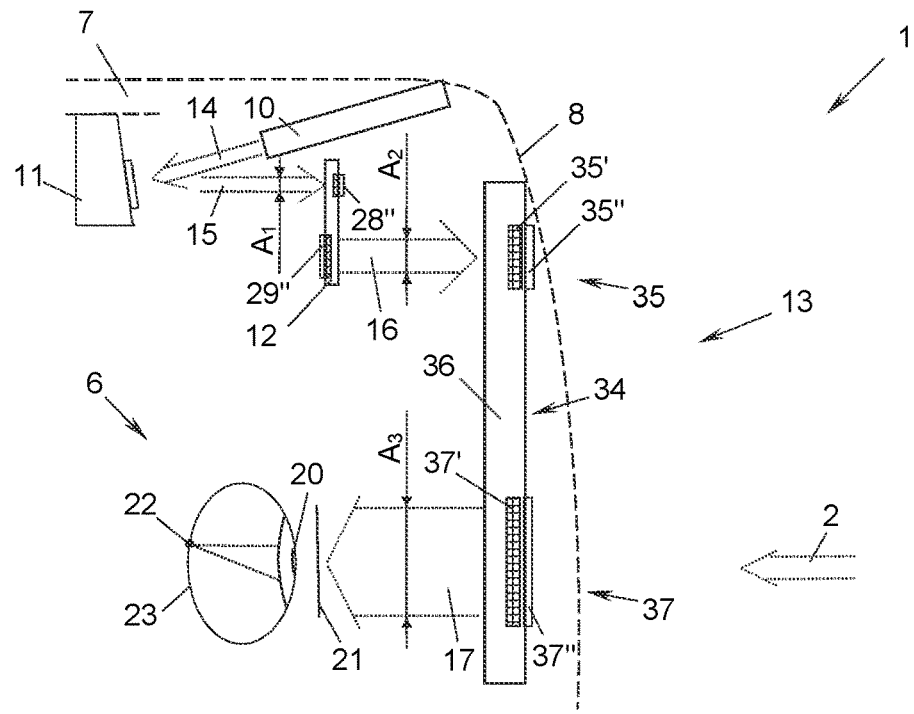
FIG. 8 in detail the MEMS mirror, waveguide, and a third embodiment of the semitransparent combiner of the display of FIGS. 1 and 3-6 in the form of a second waveguide with schematic light paths in an enlarged fragmentary top view.

With reference to FIGS. 2, 7 and 8 different embodiments of the semitransparent combiner 13 will now be explained in detail.

In FIG. 2, the combiner 13 is a semitransparent mirror 32 which reflects the collimated expanded light beam 16 as a collimated image light beam 17, for an object plane of the image 4 at infinity. Alternatively, the mirror 32 can focus or defocus ("de-collimate") the image light beam 17, e.g., to shift the object plane of the image 4 closer to the user's eye 6. For this purpose, the mirror 32 can, e.g., have an arbitrary curvature ("freeform combiner"). Additional optics 32' can optionally be arranged upstream of the mirror 32 to diverge or converge ("de-collimate") the expanded light beam 16, e.g., to shift the object plane or to compensate for unequal reflection angles over the extent of the mirror 32.

In the embodiment of FIG. 7 the semitransparent combiner 13 is a holographic optical element (HOE) 33 which encodes the above-mentioned functions of the mirror 32 by means of holography. Moreover, the HOE 33 can also expand the image light beam 17 a second time such that it has an even larger cross section $A_3$ than the expanded light beam 16, although with the same basic shape—Gaussian, top-hat, etc.—of its intensity profile $IP_3$ as the intensity profile $IP_2$ of the expanded light beam 16.

In the embodiment of FIG. 8 the semitransparent combiner 13 is formed by a second waveguide 34. The second wave-guide 34 has substantially a similar structure as the first waveguide 12, with an in-coupling section 35 in form of a diffraction grating 35' with an optional mirror 35", a plate-shaped guiding section 36, and an out-coupling section 37 in form of a diffraction grating 37' with an optional mirror 37", similar to the corresponding elements 27, 28, 28',28", 29, 29' and 29" of the first waveguide 12. The second waveguide 34 expands the cross section $A_2$ of the expanded light beam 16 to the larger cross section $A_3$ of the image light beam 17, e.g., to a cross section $A_3$ of 64-512 mm2 or more. It goes without saying that all above-mentioned embodiments of the first waveguide 12 apply to the second waveguide 34 as well. Of course, when the optional mirror 37" is used behind the out-coupling diffraction grating 37' of the second waveguide 34, it has to be semitransparent such that parts of the light field 2 can still reach the eye 6.

Each of the optional mirrors 28",29",35",37"—and also the mirror 32, if required—can be wavelength-selective, e.g., by comprising a filter, holographic element, etc., to exhibit a wavelength-dependent reflection. The semitransparent mirror 37" can even be selective to different wavelengths in its mirroring path on the one hand and in its transparent path on the other hand, i.e., for filtering out (or letting pass) a subset of spectral wavelengths when reflecting the guided collimated expanded light beam 16 into the image light beam 17 and for filtering out (or letting pass) a different subset of spectral wavelengths when letting pass the light field 2 into the image light beam 17. Thereby, e.g., the colors used for displaying the image 4 could be filtered from the light field 2 for the eye 6 to perceive an image 4 clearly distinguished from the surrounding 3, stray light could be suppressed, etc.

Depending on the walk length WL of the second waveguide 34 and the size and the diffraction efficiency E of the out-coupling diffraction grating 37', the second waveguide 34 can additionally shape the intensity profile $IP_3$ of the image light beam 17, as has been described above with respect to the first waveguide 12. The second waveguide 34 will have, however, for the additional expansion of the image light beam 17 a larger out-coupling diffraction grating 37' than the first waveguide 12 and, for a loss-less coupling with the first waveguide 12, an in-coupling diffraction grating 35' at least as large as the out-coupling diffraction grating 29' of the first waveguide 12. For guiding the expanded light beam 16 in front of the user's eye 6 the second waveguide 34 may have a longer guiding section 36 than the first waveguide 12.

Figure 9:
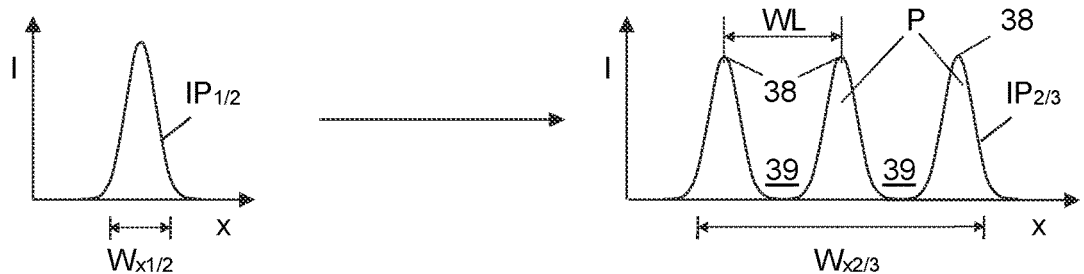
FIG. 9 intensity profiles of the input and output light beams of a waveguide suffering from banding.

The greater length of the second waveguide 34 requires a sufficient plate thickness $d_2$ to prevent breaking or cracking in use. However, increasing the plate thickness $d_1$, $d_2$ of a waveguide 12, 34 also increases its internal walk length WL so that the out-coupling portions P, whose super-position makes up the out-coupled expanded or image light beam 16 or 17, respectively, may fall apart into individual intensity peaks 38 separated by intensity drops 39 as shown in FIG. 9, a problem called "banding". Banding leads to a non-uniform eye box 21, i.e., an eye box 21 with a perceived pixel brightness varying over its extent and can also affect the field of view.

Figure 10:
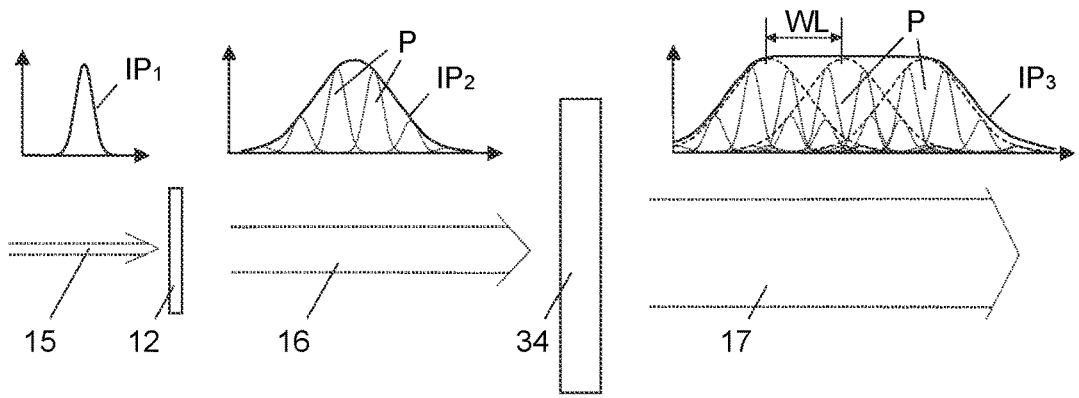
FIG. 10 the two-stage shaping of the AR light beam in the embodiment of FIG. 8 by means of first and second wave-guides and their respective input and output intensity profiles.

With the embodiment of FIGS. 8 and 10 banding can be prevented while allowing for a sufficient plate thickness $d_1$, $d_2$, in particular of the second waveguide 34, to avert the risk of structural damage in use. By pre-expanding the deflected light beam 15 in the first waveguide 12 the second waveguide 34 will guide a broader light beam 16 through its guiding section 36 which will, when superposed as portions P adjacing each other in intervals of the walk length WL given by the required thickness $d_2$, yield a continuous output intensity profile $IP_3$ without drops 39.

For example, the thickness $d_1$ of the first waveguide 12 can be 0.1-0.5 mm, in particular 0.3 mm, and the thickness $d_2$ of the second waveguides 34 can be 0.5-1 mm, in particular 0.7 mm.

Furthermore, with the two-stage beam forming by the first and second waveguides 12, 34, a large variety of shapes of the cross section $A_3$ and intensity profiles $IP_3$ of the image light beam 17 can be achieved. For example, any of the first and second waveguides 12, 34 may output a top-hat intensity profile from an input Gaussian intensity profile, a top-hat intensity profile from another top-hat intensity profile, a Gaussian intensity profile from a top-hat intensity profile, etc. Of course, the shape of the cross section $A_2$, $A_3$ of the output light beams 16, 17 can be formed as well by the respective waveguide 12, 34, e.g., from a circular, rectangular or elliptical cross section $A_1$, $A_2$ of the input light beam 15 or 16 to a square, rectangular or circular cross-section $A_2$, $A_3$ of the respective output light beam 16, 17.

For stereoscopic perception a display 1 as described herein can be used for each one of a pair of user's eyes 6. In such a stereoscopic display system with two displays 1 the displays 1 may share at least one of the components support 9, light source 10, MEMS mirror 11, or combiner 13.

While only some relative positionings of the light source 10, the MEMS mirror 11, the combiner 13 and the first and second waveguides 12, 34 have been exemplarily shown in the drawings, any different arrangement is possible as well. For example, the first waveguide 12 could guide the light beams 15, 16—instead of in the Z-shaped manner depicted—in a U-shaped manner towards the second waveguide 34, and/or the second waveguide 34 could guide the light beams 16, 17—instead of in the U-shaped manner depicted—in a Z-shaped manner towards the eye 6.

The disclosed subject matter is not restricted to the specific embodiments disclosed herein, but encompasses all variants, modifications and combinations thereof that fall within the scope of the appended claims.

What is claimed is:

1. An augmented reality display for displaying, in addition to a light field of a surrounding, an image to a user's eye, comprising:
   a support;
   a light source supported by the support and configured to emit a collimated light beam carrying said image; and
   a micro-electro-mechanical-system, MEMS, mirror supported by the support and configured to deflect the collimated emitted light beam as a collimated deflected light beam;
   a first waveguide supported by the support and having
   an in-coupling section configured to couple the collimated deflected light beam into the first wave-guide,
   a guiding section configured to guide the collimated deflected light beam through the first waveguide, and
   an out-coupling section configured to couple the collimated deflected light beam out from the first waveguide as a collimated expanded light beam whose cross section is larger than the cross section of the collimated deflected light beam; and
   a semitransparent combiner supported by the support and configured to superpose the collimated expanded light beam as an image light beam with the light field of the surrounding for displaying to the user's eye;
   wherein at least one of the in-coupling section and/or out-coupling section of the first wave-guide is formed by a diffraction grating;
   wherein the first waveguide has at least one of:
   a mirror at the far side of the in-coupling section diffraction grating when seen from the respective light beam to be coupled in, and/or
   a mirror at the far side of the out-coupling section diffraction grating when seen from the collimated expanded light beam to be coupled out; and
   further wherein the mirror is configured to redirect any parts of the light originating from the respective diffraction grating in a reverse direction back to a forward input or output direction of the respective diffraction grating.

2. The display according to claim 1, wherein the support is a spectacle frame and the semitransparent combiner is supported on the frame in the manner of an eyeglass.

3. The display according to claim 1, wherein the semitransparent combiner comprises a semitransparent mirror configured to reflect the collimated expanded light beam on its side facing the user's eye as said image light beam while letting pass the light field of the surrounding impinging on its opposite side.

4. The display according to claim 3, wherein the semitransparent mirror is configured to reflect the collimated expanded light beam de-collimated by additional optics.

5. The display according to claim 3, wherein the semitransparent mirror is formed by a holographic optical element.

6. The display according to claim 1, wherein the semitransparent combiner is a second waveguide supported by the support and having
an in-coupling section configured to couple the collimated expanded light beam into the second wave-guide,
a guiding section configured to guide the collimated expanded light beam through the second waveguide, and
an out-coupling section configured to couple the collimated expanded light beam out from the second waveguide on its side facing the user's eye as said image light beam while letting pass the light field of the surrounding impinging on its opposite side.

7. The display according to claim 6, wherein the image light beam is collimated and its cross section is larger than the cross section of the collimated expanded light beam.

8. The display according to claim 6, wherein the first and second waveguides each substantially have the shape of a plate.

9. The display according to claim 8, wherein the image light beam is collimated and its cross section is larger than the cross section of the collimated expanded light beam, and wherein the first waveguide has a smaller plate thickness than the second waveguide.

10. The display according to claim 6, wherein at least one of the in- or out-coupling sections of the second wave-guide is formed by a diffraction grating.

11. The display according to claim 10, wherein the second waveguide has a mirror at the far side of its in-coupling diffraction grating when seen from the respective light beam to be coupled in.

12. The display according to claim 10, wherein the second waveguide has a semitransparent mirror at the far side of its out-coupling diffraction grating when seen from the image light beam to be coupled out.

13. The display according to claim 12, wherein said semitransparent mirror is a wavelength-selective semitransparent mirror.

14. The display according to claim 6, wherein the guiding section of the second waveguide includes a speckle reducing element.

15. The display according to claim 6, wherein the guiding section of the second waveguide includes an intermediate diffraction grating configured to enlarge the cross section of the collimated deflected light beam guided through said guiding section.

16. The display according to claim 6, wherein the out-coupling section of the second waveguide is formed by a diffraction grating, and wherein the out-coupling diffraction grating of the second waveguide has an out-coupling efficiency increasing with distance from the in-coupling section.

17. The display according to claim 6, wherein the light source is configured to emit a light beam with a Gaussian intensity profile across its cross section, and the second waveguide is configured to couple in a light beam with a Gaussian intensity profile across its cross section and to couple out a light beam with a top-hat intensity profile across its cross section.

18. The display according to claim 6, wherein the second waveguide is configured to couple in a light beam with an elliptical or rectangular cross section and to couple out a light beam with a circular or square cross section.

19. The display according to claim 1, wherein the guiding section of the first waveguide includes a speckle reducing element.

20. The display according to claim 1, wherein the guiding section of the first waveguide includes an intermediate diffraction grating configured to enlarge the cross section of the collimated deflected light beam guided through said guiding section.

21. The display according to claim 1, wherein the out-coupling section of the first waveguide is formed by a diffraction grating, and wherein the out-coupling diffraction grating of the first waveguide has an out-coupling efficiency increasing with distance from the in-coupling section.

22. The display according to claim 1, wherein the light source is configured to emit a light beam with a Gaussian intensity profile across its cross section, and the first waveguide is configured to couple in a light beam with a Gaussian intensity profile across its cross section and to couple out a light beam with a top-hat intensity profile across its cross section.

23. The display according to claim 1, wherein the first waveguide is configured to couple in a light beam with an elliptical or rectangular cross section and to couple out a light beam with a circular or square cross section.

24. A stereoscopic display system comprising two displays according to claim 1, wherein the displays share at least one of the support, the light source, the MEMS mirror or the semitransparent combiner.

* * * * *